United States Patent Office 3,833,590
Patented Sept. 3, 1974

3,833,590
CHELATES FOR THE CONTROL OF METAL-DEFICIENCY PHENOMENA IN BIOLOGICAL SYSTEMS
Joachim Dazzi, Riehen, Switzerland, assignor to Ciba-Geigy Corporation, Ardsley, N.Y.
No Drawing. Filed July 24, 1972, Ser. No. 274,377
Claims priority, application Switzerland, July 29, 1971, 11,172/71
Int. Cl. C07c 101/26; C07f 15/02
U.S. Cl. 260—270 R     14 Claims

ABSTRACT OF THE DISCLOSURE

Heavy metal chelates of ethylenediaminetetraacetic acid derivatives $$R-NH-C(=O)-CH_2-N(CH_2COOH)-CH_2-CH_2-N(CH_2COOH)-CH_2-C(=O)-NH-R \quad (I)$$

are useful for the control of metal-deficiency phenomena in biological systems. In the formula R represents the phenyl or naphthyl radical which can be substituted by halogen, hydroxy, mercapto, nitro, cyano, thiocyano, alkyl, alkoxy, halogenoalkyl, acyl, acylamino, acyloxy, carboxyl, alkoxycarbonyl, carbamoyl, pyridoylamino, N-carboxyalkyl-carbamoyl, sulpho, sulphamoyl, mono- or dialkylated or phenylated sulphamoyl which can also carry one of the groups $$-CH_2-CH_2-SO_3H \text{ or } -CH_2-COOH,$$

alkylsulphonyl, alkoxysulphonyl, or by an optionally hydroxy-containing phenylsulphonyl or phenoxysulphonyl; or wherein R represents the pyridine or quinoline radical which can be substituted by halogen, hydroxy, alkyl, or carbamoyl.

---

Chelating agents are already known and are employed in many commercial fields. The chelating agent with the widest field of application is ethylenediaminetetraacetic acid. It is already known that metal chelates of ethylenediaminetetraacetic acid EDTA, as well as of other chelating agents, are used for the correction of metal-deficiency phenomena occurring in plants and mammals. For example, the iron chelate of ethylenediaminetetraacetic acid is used for the treatment of asiderosis occurring in citrus plants growing in acid soil. It is known, however, that this chelate is unstable in neutral and weakly alkaline solution; there then occurs a decomposition which produces iron(III)hydroxide and a soluble salt of ethylenediaminetetraacetic acid. It is consequently not possible for this chelate to be successfully used for the correction of metal-deficiency phenomena occurring in plants growing in alkaline soil.

It has recently been suggested that the iron chelates of hydroxyethylenediaminetriacetic acid, and of certain ethylene-bis-(α-imino-o-hydroxyphenylacetic acids), likewise be used for plant nutrition. These chelates are somewhat more effective than the chelates of ethylenediaminetetraacetic acid, but do not, however, possess the desired stability over a wide pH-range (Brit. Pat. No. 832,989).

The present invention describes new chelating agents which are capable of complex-formation with metal ions, especially with iron(III) ions, which are stable in a wide pH-range. They are thus suitable for the correction of metal-deficiency phenomena occurring both in plants growing in acid soils and in plants growing in alkaline soils. The new chelating agents are also suitable for use in other fields for which chelating agents have already been employed, e.g. for analytic chemistry.

The new chelating agents are derivatives of ethylenediaminetetraacetic acid and correspond to formula I:

$$R-NH-C(=O)-CH_2-N(CH_2COOH)-CH_2-CH_2-N(CH_2COOH)-CH_2-C(=O)-NH-R$$

wherein

R represents the phenyl or naphthyl radical which can be substituted by halogen, hydroxy, mercapto, nitro, cyano, thiocyano, alkyl, alkoxy, halogenoalkyl, acyl, acylamino, acyloxy, carboxyl, alkoxycarbonyl, carbamoyl, pyridoylamino, N-carboxyalkyl-carbamoyl, sulpho, sulphamoyl, mono- or dialkylated or phenylated sulphamoyl, alkylsulphonyl, alkoxysulphonyl, or by an optionally hydroxy-containing phenylsulphonyl or phenoxysulphonyl; or R represents the pyridine or quinoline radical which can be substituted by halogen, hydroxy, alkyl or carbamoyl.

Alkyl radicals in formula I are lower radicals having 1 to 6 carbon atoms in a straight or branched chain, i.e. the methyl, ethyl, n-propyl, isopropyl, isobutyl, n-butyl, sec-butyl, or tert-butyl radical, as well as the n-pentyl and n-hexyl radical and isomers thereof. The mentioned radicals form also the alkyl moiety of alkoxy, alkoxycarbonyl, alkylated sulphamoyl, N-carboxyalkyl-carbamoyl, alkylsulphonyl or alkoxysulphonyl radicals. As halogenated radicals, $C_1-C_4$-alkyl radicals can be mono- or polysubstituted by fluorine, chlorine, bromine or iodine; the trifluoromethyl radical is preferred. To be mentioned as acyl radicals are, in particular, alkanoyl radicals such as the acetyl or propionyl radical, or a benzoyl radical substituted by hydroxy and carboxyl. Acyloxy or acylamino radicals likewise preferably contain these substituents. Halogen can be fluorine, chlorine, bromine or iodine. A sulphamoyl radical can also be substituted by the group $-CH_2-CH_2-SO_3H$ or $-CH_2-COOH$.

For the production of metal chelates, such ethylenediaminetetraacetic acid derivatives of formula I are preferred, by virtue of the particularly good properties of the chelates, wherein R represents a phenyl radical containing a maximum of four substituents from the group hydroxyl, sulpho, sulphamoyl, mono- or di-lower-alkyl-sulphamoyl, $-SO_2NH-CH_2CH_2-SO_3H$, carboxyl, alkoxycarbonyl, methylsulphonyl, cyano, nitro, chlorine, bromine or acetyl; or wherein R represents a pyridyl radical, hydroxypyridyl radical, pyridoylamino radical or a carbamoylpyridyl radical.

The active substances according to the invention are obtained by the reaction of the anhydride of ethylenediaminetetraacetic acid $$\underset{\substack{O \\ \parallel}}{C}-H_2C\diagdown_{O}\diagup\underset{\substack{\parallel \\ O}}{C}-H_2C\diagup N-CH_2-CH_2-N\diagdown\underset{\substack{\parallel \\ O}}{CH_2-C}\diagup O\diagdown\underset{\substack{\parallel \\ O}}{CH_2-C}$$

with 2 equivalents of an amine of formula II $$R-NH_2 \quad (II)$$

wherein R has the meanings given under formula I.

The reaction is performed in an inert-gas atmosphere and in the presence of solvents and diluents inert to the reactants. The following are, for example, suitable: aliphatic, aromatic or halogenated hydrocarbons such as benzene, toluene, xylenes, chlorobenzene, chloroform, methylene chloride, ethylene chloride; ethers and ethereal compounds such as dialkyl ether, ethylene glycol mono- or -dialkyl ether, tetrahydrofuran, dioxane; alkanols such as methanol, ethanol, n-propanol, isopropanol; ketones such as acetone, methyl ethyl ketone; nitriles such as acetonitrile or 2 - methoxypropionitrile; N,N - dialkylated amides such as dimethylformamide; dimethylsulphoxide, tetramethylurea; as well as mixtures of these solvents with each other. If the employed amine or a salt thereof is soluble in water, then it is possible to use water as the reaction medium at low temperature, preferably below 10° C.

The reaction can be carried out as follows:

(a) the anhydride of the EDTA is taken into solution at refluxing temperature, and the amine, likewise in solution, added; or
(b) both reactants are suspended in the given solvent and the suspension heated, with vigorous stirring, to the reflux temperature; or preferably
(c) the amine is taken into solution, and the dissolved anhydride of the EDTA added dropwise at the reflux temperature.

The final products are crystalline and can be readily isolated. They can be reacted in the dried condition or whilst still moist to the corresponding metal chelate. This reaction is performed with a heavy metal compound, preferably with iron(III) chloride, in the presence of water, or of alkanols such as methanol or ethanol, and alkali metal hydroxides such as sodium or potassium hydroxide, or in the presence of ammonium hydroxide.

It was determined by measurements that these complexes are stable over a wide pH-range, particularly up to pH 10. They can therefore be used with excellent success also in alkaline soils, whereas the chelates of ethylenediaminetetraacetic acid are used only in acid soils, since they decompose in neutral or in slightly alkaline soils.

The process according to the invention for the production of the new compounds of formula I is illustrated by the following examples. The term "parts" denotes parts by weight, and temperatures are expressed in degrees Centigrade.

Further compounds of formula I which were produced by the described processes are listed in the table attached to the examples. The characterisation of some compounds in the form of their alkali metal salts is done mainly for practical reasons, in that chelation with the polyvalent metal cation, as mentioned above, is performed as a rule from the alkali-metal-salt form. Compounds having acid groups are in some cases characterised in several forms: as acids, as acid salts or as neutral salts.

EXAMPLE 1

Amounts of 200.2 g. of 2-aminophenol and 1.8 litres of acetonitrile are heated within 10 minutes in a nitrogen atmosphere, with stirring, to the refluxing temperature. An addition is made to the obtained solution at the same temperature, in the course of 30–40 minutes, of 232 g. of 1,2-bis-[2,6-dioxomorpholinyl-(4)]-ethane dissolved hot in 5.6 litres of acetonitrile, a crystalline product being obtained after 2–3 minutes. Stirring is continued for 16 hours with refluxing, and the reaction mixture then allowed to cool to room temperature. The crystals are filtered off, washed with ca. 200 ml. of acetonitrile, and dried at 80°. The yield is 95% of the theoretical value. The obtained N,N'-bis-(carboxymethyl)-N,N'-bis-(2-hydroxyacetanilido)-1,2-diaminoethane of formula I (R=2-hydroxyphenyl) melts at 207–208° with decomposition.

EXAMPLE 2

A mixture consisting of 20.5 g. of 1,2-bis-[2,6-dioxomorpholinyl-(4)]-ethane (anhydride of EDTA), 23 g. of 2-amino-4-chlorophenol and 300 ml. of isopropanol is very rapidly stirred for 1.5 hours in a 750 ml. sulphating flask. After cooling, an amount of 40.9 g. (=94% of theory) of N,N'-bis-(carboxymethyl) - N,N' - bis - (2-hydroxy-5-chloroacetanilido)-1,2-diaminoethane is isolated at 20°, M.P. 237–238°.

EXAMPLE 3

An amount of 45 g. of N,N'-bis-(carboxymethyl)-N,N'-bis-(2-hydroxy - 5 - chloroacetanilido)-1,2-diaminoethane (obtained by the process described in Example 1 or 2) is suspended in 160 ml. of ethanol. An addition is made dropwise to this suspension, with stirring, of 14.4 g. of iron(III) chloride in 80 ml. of ethanol, and then slowly one of 14.4 g. of sodium hydroxide in 150 ml. of ethanol. The reaction mixture heats up to 40°. Stirring is continued for two hours; the solvent is then evaporated off, and the residue dried for 24 hours at 80°/12 mm.

The obtained monosodium salt of N,N'-bis-(carboxymethyl)-N,N'-bis(2-hydroxy - 5 - chloroacetanilido)-1,2-diaminoethane-iron(III) complex decomposes from 200° and gives the following analysis values:

Calculated: C 32.6, H 2.7, N 6.9, Na 11.3, Cl 21.9, Fe 6.9%

Found: C 33.2, H 3.1, N 6.9, Na 10.7, Cl 21.1, Fe 7.1%

EXAMPLE 4

An amount of 19 g. of 2-aminophenol-4-sulphonic acid is dissolved at 0° in 50 ml. of 2N NaOH in a beaker, and the solution rapidly stirred. Whilst ice-cooling is applied, 12.8 g. of 1,2-bis-[2,6-dioxomorpholinyl-(4)]-ethane is introduced within a period of 2 minutes; the pH-value decreases rapidly from 6.3 to 4.8, and then remains constant at pH 4 during the subsequent reaction time. There is obtained from the reaction mixture an amount of 34 g. of the Na-salt of N,N'-bis-(carboxymethyl)-N,N'-bis-(2-hydroxyphenyl - 5 - sulphonic acid)-1,2-diaminoethane (R=2-hydroxyphenylsulphonic acid sodium salt), M.P. 240–242° (decomposition) [compound 43].

Further compounds of formula I:

$$R-NH-\underset{O}{\underset{\|}{C}}-CH_2-\underset{\underset{COOH}{|}}{\underset{|}{N}}-CH_2-CH_2-\underset{\underset{COOH}{|}}{\underset{|}{N}}-CH_2-\underset{O}{\underset{\|}{C}}-NH-R \quad (I)$$

were obtained, by the processes described in Examples 1, 2 and 4, wherein R has the following meanings:

| Compound number: | R | Melting point |
|---|---|---|
| 1 | 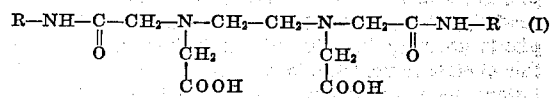 (CH₃, OH on phenyl) | 239–240 |
| 2 | (phenyl) | 203–205 |
| 3 | (COOH, OH on phenyl) | 284–285 |

TABLE—Continued

| | R | Melting point |
|---|---|---|
| 4 | NO$_2$–C$_6$H$_3$(OH)– | 268-269 |
| 5 | CH$_3$–SO$_2$–C$_6$H$_3$(OH)– | 264-265 |
| 6 | NC–C$_6$H$_4$– | 204-206 |
| 7 | C(CH$_3$)$_3$–C$_6$H$_3$(OH)– | 249-250 |
| 8 | HS–C$_6$H$_4$– | 206-207 |
| 9 | H$_2$N–O$_2$S–C$_6$H$_4$– | 216-217 |
| 10 | HO–C$_6$H$_4$– | 226-228 |
| 11 | NC–C$_6$H$_3$(OH)– | 236 |
| 12 | C$_6$H$_5$–NH– | 190-191 |
| 13 | OCH$_3$–C$_6$H$_3$(OCH$_3$)– | 205-206 |
| 14 | OCH$_3$–C$_6$H$_4$– | 192-193 |
| 15 | CF$_3$–C$_6$H$_4$– | 153-154 |
| 16 | H$_2$N–O$_2$S–C$_6$H$_3$(OH)– | 285-287 |
| 17 | Cl, O$_2$N–C$_6$H$_2$(OH)– | 285-286 |
| 18 | CH$_3$–CO–C$_6$H$_3$(OH)– | 237-238 |
| 19 | CH$_3$–COHN–C$_6$H$_4$– | 254-255 |
| 20 | HOOC–CH$_2$–NH–OC–C$_6$H$_4$– | 200-201 |

TABLE—Continued

| | R | Melting point |
|---|---|---|
| 21 | [phenyl with NH-CO-CH₃] | 204-205 |
| 22 | H₂N-OC-[pyridine] | 210-214 |
| 23 | HOOC-[phenyl]-OH | 250-251 |
| 24 | [phenyl]-OH | 213-215 |
| 25 | [phenyl with Cl, Cl, Cl, OH] | 204-205 |
| 26 | [phenyl]-COOH | 211-213 |
| 27 | [phenyl]-SO₂-[phenyl]-OH | 280-282 |
| 28 | [naphthyl]-OH | 258-259 |
| 29 | [phenyl]-Cl | 190-192 |
| 30 | [phenyl with Cl, OCH₃] | 243-245 |
| 31 | [phenyl]-SO₂-O-[phenyl] | 185-187 |
| 32 | NC-[phenyl] | 181-182 |
| 33 | [pyridine] | 218-219 |
| 34 | [pyridine-OH] | 155-158 |
| 35 | [quinoline] | 229-230 |
| 36 | [phenyl with Cl, Cl, COOH] | 232 |

TABLE—Continued
| | R | | Melting point |
|---|---|---|---|
| 3 | CH₃—SO₂—⟨benzene with NO₂, OH⟩— | | 230 |
| 38 | CH₃—OC—⟨C₆H₄⟩— | | 209 |
| 39 | O₂N—⟨C₆H₃(Cl)⟩— | | 238 |
| 40 | H₂N—O₂S—⟨C₆H₃(Cl)⟩— | | 205 |
| 41 | Cl,Cl—⟨C₆H₃⟩— | | 216 |
| 42 | HOOC—⟨C₆H₄⟩— | | 310 |
| 43 | ⟨C₆H₃(SO₃Na)(OH)⟩— | | 240–242 |
| 44 | ⟨C₆H₂(NO₂)(NaO₃S)(OH)⟩— | Di-Na-salt | 271 |
| 45 | ⟨C₆H₄(COONa)⟩— | | 224 |
| 46 | ⟨naphthalene(NaO₃S)(OH)⟩— | | 290–292 |
| 47 | ⟨C₆H₂(Cl)(Br)(OH)⟩— | | 271–273 |
| 48 | J—⟨C₆H₃(COOH)⟩— | | 196–198 |
| 49 | Br—⟨C₆H₃(OH)⟩— | | 241–242 |
| 50 | ⟨C₆H₂(NO₂)(NaO₃S)(OH)⟩— | Tetra-Na-salt | >300 |
| 51 | ⟨C₆H₂(SO₃K)(KO₃S)(OH)⟩— | Tetra-K-salt | >300 |
| 52 | CH₃—NH—SO₂—⟨C₆H₃(COONa)⟩— | | 223–225 |
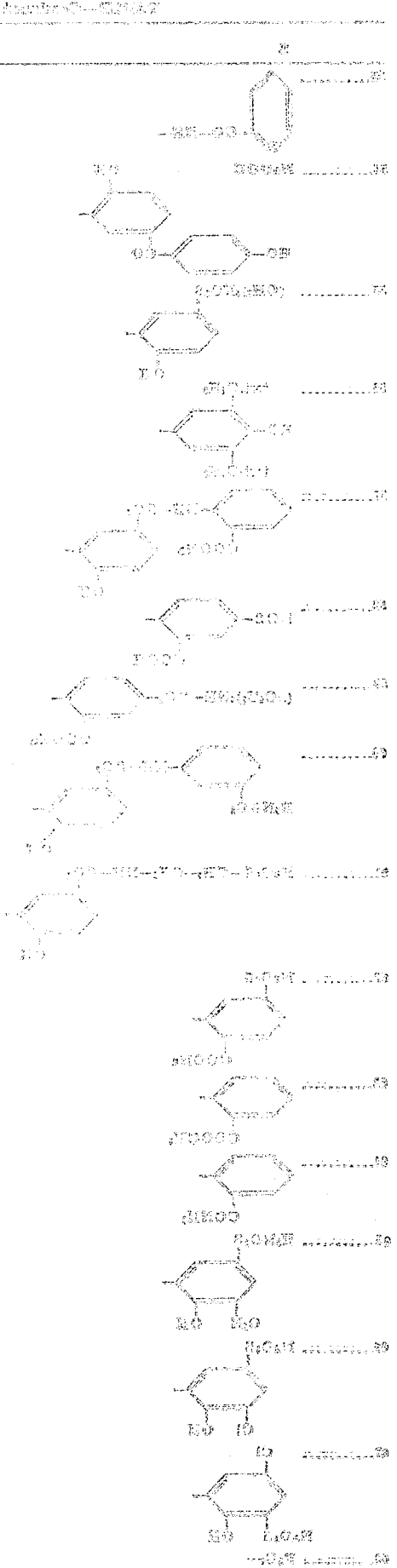

| | R | | Melting point |
|---|---|---|---|
| 53 | (pyridine-2-CO-NH–) | | 168–170 |
| 54 | NaOOC–C6H3(OH)–CO–C6H3(OH)– | Tetra-Na-salt. | 280–282 |
| 55 | (CH₃)₂NO₂S–C6H3(OH)– | | 263–265 |
| 56 | tert.C₄H₉, HO, tert.C₄H₉ substituted phenyl | | 234–235 |
| 57 | –NH–SO₂–C6H3(OH)–, COONa | Tetra-Na-salt. | 240–242 |
| 58 | NCS–C6H3(COOH)– | | 153–155 |
| 59 | (nC₄H₉)₂NH–SO₂–C6H3(COONa)– | | 144–146 |
| 60 | H₂NSO₂–C6H4–NH–SO₂–C6H3(OH)– | Di-Na-salt. | 150 |
| 61 | NaO₃S–CH₂–CH₂–NH–SO₂–C6H3(OH)– | Tetra-Na-salt. | 245–246 |
| 62 | NaO₃S–C6H3(COONa)– | do | >300 |
| 63 | pyridine–COOCH₃ | | 197–198 |
| 64 | C6H4–CONH₂ | | 199–200 |
| 65 | H₂NO₂S–C6H2(O₂N)(OH)– | | >300 |
| 66 | NaO₃S–C6H2(Cl)(OH)– | | >300 |
| 67 | Cl–C6H2(NaO₃S)(OH)– | | >300 |
| 68 | F₃C₆– | | >235 |

Tests for the control of chlorosis (a) 10–14 Day-old tomato and oat plants exhibiting clear symtoms of chlorosis produced by an $Fe^{+++}$-free nutrient solution are placed into a nutrient solution according to Hewitt*, the solution containing the iron chelate in concentrations of 10 and 1 mg. of iron per litre, respectively. The pH value is stabilised at 7.5–8 by means of a buffer solution. The results of the test are evaluated after 14 days.

The commercial product Na/Fe-diethylenetriaminepentaacetic acid (=Sequestrene 330 Fe®) taken as a comparison caused, compared with the iron chelates of the present invention, a slight change of colour of the leaves from yellow to green.

| Compound number | Oat plants 10 p.p.m. | 1 p.p.m. | Tomato plants 10 p.p.m. | 1 p.p.m. | Compound number | Oat plants 10 p.p.m. | 1 p.p.m. | Tomato plants 10 p.p.m. | 1 p.p.m. |
|---|---|---|---|---|---|---|---|---|---|
| Ex. 1 | ++ | ++ | ++ | ++ | 17 | + | + | ++ | + |
| 1 | ++ | ++ | ++ | + | 18 | + | + | ++ | + |
| 2 | ++ | ++ | ++ | + | 29 | ++ | + | ++ | ++ |
| 33 | ++ | ++ | ++ | ++ | 30 | + | o | + | + |
| 3 | ++ | ++ | ++ | ++ | 31 | ++ | + | ++ | + |
| Ex. 2 | ++ | + | ++ | + | 32 | ++ | + | ++ | ++ |
| 4 | ++ | + | + | ++ | 36 | ++ | ++ | ++ | + |
| 8 | ++ | ++ | + | + | 37 | ++ | + | ++ | + |
| 9 | ++ | ++ | ++ | ++ | 38 | ++ | + | ++ | ++ |
| 35 | ++ | ++ | ++ | ++ | 39 | ++ | ++ | ++ | ++ |
| 34 | ++ | + | ++ | ++ | 40 | ++ | ++ | ++ | ++ |
| 5 | + | o | + | + | 41 | ++ | + | ++ | ++ |
| 10 | ++ | + | + | + | 42 | ++ | + | ++ | ++ |
| 6 | ++ | + | ++ | + | 11 | ++ | + | ++ | ++ |
| 7 | ++ | o | ++ | + | 22 | ++ | + | ++ | ++ |
| 13 | ++ | + | ++ | + | 43 | ++ | + | ++ | ++ |
| 14 | + | + | ++ | + | 44 | }++ | + | ++ | + |
| 15 | ++ | ++ | ++ | ++ | 50 | | | | |
| 19 | ++ | + | ++ | ++ | 26 | }++ | + | ++ | + |
| 20 | ++ | o | ++ | ++ | 45 | | | | |
| 21 | ++ | + | ++ | ++ | 28 | ++ | ++ | ++ | + |
| 16 | ++ | + | ++ | ++ | | | | | |
| 23 | ++ | + | ++ | ++ | Sequestrene 330 Fe® | ++ | o | ++ | o |
| 24 | ++ | + | ++ | + | | | | | |
| 27 | + | o | ++ | + | | | | | |

Explanation:
 ++=leaves deep green
 +=leaves light green
 O=leaves yellow (chlorosis)

(b) Soya bean plants are germinated in quartz sand, and then planted in a special alkaline soil (pH=7.8 in water). When the topmost leaves exhibit severe chlorosis symptoms, the pure iron chelates are mixed in solid form with the uppermost layer of soil and distributed by watering. The concentrations are respectively 1 and 0.3 mg. of iron per pot, each pot containing three plants. The colouration of the leaves is assessed after 14 days.

| | Concentration of Fe | |
|---|---|---|
| | 1 mg. | 0.3 mg. |
| Compound number: | | |
| 3 | ++ | + |
| 5 | ++ | + |
| 6 | ++ | + |
| 16 | ++ | + |
| 17 | ++ | + |
| 18 | ++ | + |
| 33 | ++ | + |
| 37 | ++ | ++ |
| 40 | ++ | + |
| 11 | ++ | ++ |
| 22 | ++ | + |
| 43 | ++ | + |
| 44 | ++ | + |
| 45 | ++ | + |
| Sequestrene 330 Fe® | + | o |

Explanation:
 ++=leaves deep green
 +=leaves light green
 O=leaves yellow (chlorosis)

Agents according to the invention are produced in a manner known per se by the intimate mixing and grinding of active substances with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);
water-dispersible concentrates of the active substance: wettable powders and pastes;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground plastics, fertilisers such as ammonium sulphate, ammonium phosphate, ammonium nitrate, urea, ground vegetable products such as bran, bark dust, saw dust, ground nutshells, cellulose powder, residues of plant extractions, active charcoal, etc., alone or in admixture with each other.

The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparations are from 0.5 to 80%.

It is possible to add to these mixtures also additives stabilising the active substance, and/or non-ionic, anionactive, and cation-active substances, which, for example, improve the adhesiveness of the active substances (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxy methyl celluose), hydroxyethyene glycol ethers of monoalkyl and dialky phenols having 5 to 15 ethylene oxide radicals per molecule and 8 to 9 carbon atoms in the alkyl radical, ligninsulphonic acid, its alkali metal and alkaline-earth metal salts, polyethylene glycol ethers (carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substances, i.e. wettable powders and pastes, are agents which can be

---

*E. K. Hewitt ("Sand and water culture methods used in the study of plant nutrition," Techn. Comm. No. 22, Commonwealth Bureau of Horticulture and Plantation Crops, East Malling, 1966).

diluted with water to obtain any desired concentration. They consist of active substance, carrier, optionally additives which stabilise the active substance, surface-active substances, and anti-foam agents. The concentration of active substance in these agents is 5–80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of the solid preparations. It is advantageous in some cases to use mixtures of different carriers. It is possible to use as dispersing agents, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm., and in the case of pastes not exceeding 0.03 mm. Dispersing agents such as those mentioned in the preceding paragraphs and water are used in the preparation of pastes.

Furthermore, the agents according to the invention can be used in the form of solutions. For this purpose the active substance (or several active substances) is (or are) dissolved in suitable organic solvents, mixtures of solvents, water, or mixtures of organic solvents with water. The solutions should contain the active substance in a concentration of from 1 to 20%. These solutions can be applied with the aid of sprays.

Other biocidal active substances or agents may be added to the described agents according to the invention. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilisers, other trace elements, etc.

Preparations of the new active substances are described in the following. The term 'parts' denotes parts by weight.

Wettable powder

The following constituents are used for the preparation (a) of a 50%, (b) of a 25%, and (e) of a 10% wettable powder:

(a)

50 parts of the monosodium salt of the iron (III)-complex of the compound mentioned in Example 2,
5 parts of sodium dibutylnaphthyl sulphonate,
3 parts of naphthalenesulphonic acid/phenolsulphonic acid/formaldehyde condensate 3:2:1,
20 parts of kaolin,
22 parts of Champagne chalk;

(b)

25 parts of the monosodium salt of the iron(III)-complex of the compound No. 1,
5 parts of the sodium salt of oleyl methyl tauride,
2.5 parts of naphthalenesulphonic acid/formaldehyde condensate,
0.5 part of carboxymethylcellulose,
5 parts of neutral potassium aluminium silicate,
62 parts of kaolin;

(c)

10 parts of the monosodium salt of the iron(III)-complex of the compound No. 3,
3 parts of a mixture of sodium salts of saturated fatty alcohol sulphates,
5 parts of naphthalenesulphonic acid/formaldehyde condensate,
82 parts of kaolin.

The given active substance is mixed with the carriers (kaolin and chalk), and the mixture subsequently ground. Wettable powders are obtained possessing excellent wetting and suspension properties. Suspensions of any desired concentration can be prepared from such wettable powders by dilution with water.

Paste

The following substances are used for the preparation of a 45% paste:

45 parts of the monosodium salt of the iron(III)-complex of compound No. 34,
5 parts of sodium aluminium silicate,
14 parts of cetyl polyglycol ether having 8 moles of ethylene oxide,
1 part of oleyl polyglycol ether having 5 moles of ethylene oxide,
2 parts of spindle oil,
10 parts of polyethylene glycol,
23 parts of water.

The active substance is intimately mixed and ground, in suitable apparatus, with the additives. A paste is obtained from which can be prepared, by dilution with water, suspensions of any desired concentration.

Patent claims:

1. Ethylenediaminetetraacetic acid derivatives of formula I and their alkali-metal salts and ferric chelates $$R-NH-\underset{O}{\overset{\parallel}{C}}-CH_2-N(-CH_2-COOH)-CH_2-CH_2-N(-CH_2-COOH)-CH_2-\underset{O}{\overset{\parallel}{C}}-NH-R \quad (I)$$

wherein
R represents naphthyl; phenyl or naphthyl substituted by halogen, hydroxy, mercapto, nitro, cyano, thiocyano, $C_1$–$C_6$ alkyl, $C_1$–$C_6$ alkoxy, $C_1$–$C_4$ halogenoalkyl, $C_2$–$C_3$ acyl, $C_2$–$C_3$ acylamino, $C_2$–$C_3$ acyloxy, carboxyl, alkoxycarbonyl having $C_1$–$C_6$ alkyl groups, carbamoyl, pyridoylamino, N-carboxyalkylcarbamoyl having $C_1$–$C_6$ alkyl groups, sulpho, sulphamoyl, mono- or di-$C_1$–$C_6$ alkyl groups, sulpho, sulphamoyl, mono- or di-$C_1$–$C_6$-alkylated or phenylated sulphamoyl substituted by —$CH_2$—$CH_2$—$SO_3H$ or —$CH_2$—COOH, $C_1$–$C_6$ alkylsulphonyl, $C_1$–$C_6$ alkoxysulphonyl, phenylsulphonyl, phenoxysulphonyl, hydroxy-containing phenylsulphonyl or hydroxy-containing phenoxysulphonyl; or pyridyl, quinolyl or pyridyl and quinolyl substituted by halogen, hydroxy, $C_1$–$C_6$ alkyl, or carbamoyl.

2. Compounds and their alkali-metal salts and ferric chelates according to Claim 1, wherein R represents substituted phenyl containing a maximum of four substituents from the group hydroxy, sulpho, sulphamoyl, mono- or di-$C_1$–$C_6$-alkylsulphamoyl, —$SO_2NH$—$CH_2CH_2$—$SO_3H$, —$SO_2NH$—$CH_2$—COOH, carboxyl, alkoxycarbonyl having $C_1$–$C_6$ alkyl groups, methylsulphonyl, cyano, nitro, chlorine, bromine, or acetyl; pyridyl; hydroxypyridyl; pyridoylamino or carbamoylpyridyl.

3. Compounds and their alkali metal salts and ferric chelates according to Claim 1, wherein R represents substituted phenyl which contains a maximum of three substitutents from the group hydroxy, sulpho, sulphamoyl, mono- or di-$C_1$–$C_6$-alkylsulphamoyl,

—$SO_2NH$—$CH_2CH_2$—$SO_3H$,

—$SO_2NH—CH_2—COOH$, carboxyl, alkoxycarbonyl having $C_1$–$C_6$ alkyl groups, methylsulphonyl, cyano, nitro, chlorine, bromine, or acetyl.

4. The compound of the formula:

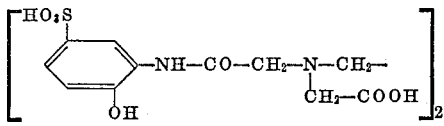

and its alkali-metal salts and ferric chelates according to Claim 1.

5. The compound of the formula:

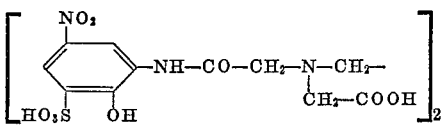

and its alkali-metal salts and ferric chelates according to Claim 1.

6. The compound of the formula:

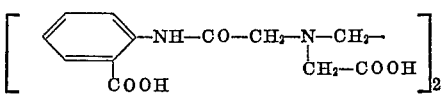

and its alkali-metal salts and ferric chelates according to Claim 1.

7. The compound of the formula:

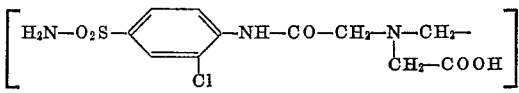

and its alkali-metal salts and ferric chelates according to Claim 1.

8. The compound of the formula:

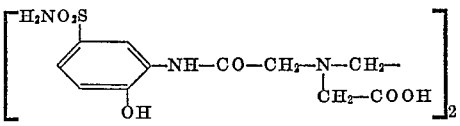

and its alkali-metal salts and ferric chelates according to Claim 1.

9. The compound of the formula:

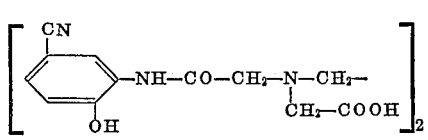

and its alkali-metal salts and ferric chelates according to Claim 1.

10. The compound of the formula:

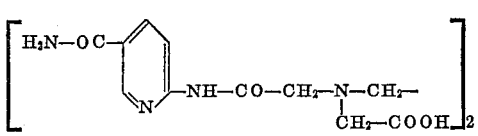

and its alkali-metal salts and ferric chelates according to Claim 1.

11. The compound of the formula:

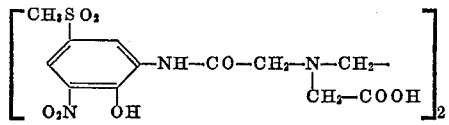

and its alkali-metal salts and ferric chelates according to Claim 1.

12. The compound of the formula:

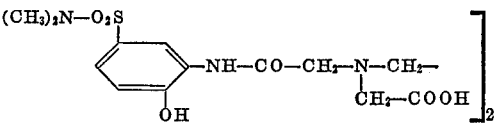

and its alkali-metal salts and ferric chelates according to Claim 1.

13. The compound of the formula:

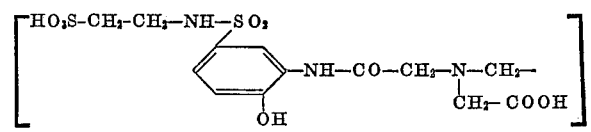

and its alkali-metal salts and ferric chelates according to Claim 1.

14. The compound of the formula:

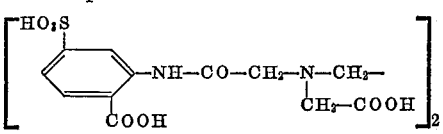

and its alkali-metal salts and ferric chelates according to Claim 1.

References Cited
UNITED STATES PATENTS

| | | | |
|---|---|---|---|
| 3,024,277 | 3/1962 | Hotten | 260—534 E |
| 3,196,153 | 7/1965 | Dazzi | 260—534 E |
| 3,214,377 | 10/1965 | Hotten | 260—578 R |
| 3,248,207 | 4/1966 | Knell et al. | 260—439 R |
| 3,429,915 | 2/1969 | Bersworth | 260—534 E |
| 3,351,658 | 11/1967 | Bersworth | 260—439 R |
| 3,507,892 | 4/1970 | Bersworth | 260—429 J |
| 3,580,950 | 5/1971 | Bersworth | 260—534 E |

OTHER REFERENCES

IMAI, Die Makromolekolare Chemie 138 (1970), pp. 293–7.

PATRICK P. GARVIN, Primary Examiner

A. P. DEMERS, Assistant Examiner

U.S. Cl. X.R.

71—1; 260—287 R, 295 RM, 429 J, 465 D, 439 R, 471 A, 471 R, 507 R, 518 R, 534 E

UNITED STATES PATENT OFFICE
CERTIFICATE OF CORRECTION

Patent No. 3,833,590    Dated September 3, 1974

Inventor(s) Joachim Dazzi

It is certified that error appears in the above-identified patent and that said Letters Patent are hereby corrected as shown below:

Column 16, Claim 1, lines 52 and 53, delete "alkyl groups, sulpho, sulphamoyl, mono- or di-$C_1$-$C_6$"

Column 16, line 53, between "sulphamoyl" and "substituted", insert ", mono- or di-$C_1$-$C_6$-alkylated or phenylated sulphamoyl"

Column 18, Claim 13, in the formula, insert a sub-script 2 after the closing bracket Signed and Sealed this second Day of September 1975

[SEAL]

Attest:

RUTH C. MASON
Attesting Officer

C. MARSHALL DANN
Commissioner of Patents and Trademarks